United States Patent
Kury

(10) Patent No.: US 9,476,529 B2
(45) Date of Patent: Oct. 25, 2016

(54) HOSE NIPPLE AND HOSE ARRANGEMENT

(75) Inventor: Werner Kury, Mullheim (DE)

(73) Assignee: NEOPERL GMBH, Mullheim (DE)

( * ) Notice: Subject to any disclaimer, the term of this patent is extended or adjusted under 35 U.S.C. 154(b) by 0 days.

(21) Appl. No.: 14/127,013

(22) PCT Filed: Feb. 29, 2012

(86) PCT No.: PCT/EP2012/000870
§ 371 (c)(1),
(2), (4) Date: Dec. 17, 2013

(87) PCT Pub. No.: WO2012/175148
PCT Pub. Date: Dec. 27, 2012

(65) Prior Publication Data
US 2014/0138944 A1    May 22, 2014

(30) Foreign Application Priority Data

Jun. 21, 2011 (DE) .................. 20 2011 102 083

(51) Int. Cl.
*F16L 33/207*    (2006.01)
*F16L 33/30*     (2006.01)

(52) U.S. Cl.
CPC ........ *F16L 33/2076* (2013.01); *F16L 33/2071* (2013.01); *F16L 33/30* (2013.01)

(58) Field of Classification Search
CPC . F16L 33/30; F16L 33/2071; F16L 33/2076; F16L 33/207; F16L 33/20; F16L 33/24
USPC ...................... 285/239, 256, 136.1
See application file for complete search history.

(56) References Cited

U.S. PATENT DOCUMENTS 2,121,624 A    6/1938    Cowles
2,314,001 A *  3/1943    Lusher ............. F16L 33/2076
                                              285/148.16

(Continued)

FOREIGN PATENT DOCUMENTS

EP    2020552    2/2009
EP    2330326    6/2011

*Primary Examiner* — Daniel P Stodola
*Assistant Examiner* — Zachary Dragicevich
(74) *Attorney, Agent, or Firm* — Volpe and Koenig, P.C.

(57) ABSTRACT

A hose nipple (4) for a hose arrangement (1) is provided, having retaining ribs (6) on the outer side. According to the invention, the retaining ribs (6) vary in their form, size and arrangement on the nipple base body (5) between the hose side (12) and the outlet side (11) of the hose nipple (4) such that a uniform and parallel input of force into the pressure hose (2) is achieved by the retaining ribs (6), which causes the force- and/or form-fitting connection between the hose nipple (4) and the pressure hose (2) fitted thereon.

12 Claims, 4 Drawing Sheets

(56) References Cited

U.S. PATENT DOCUMENTS

| | | | | |
|---|---|---|---|---|
| 2,314,236 A | * | 3/1943 | Mott | F16L 33/2076 285/256 |
| 4,142,554 A | | 3/1979 | Washkewicz et al. | |
| 4,305,608 A | * | 12/1981 | Stuemky | F16L 33/2076 285/256 |
| 4,392,678 A | * | 7/1983 | Adamczyk | F16L 33/2076 285/256 |
| 4,431,031 A | * | 2/1984 | Ettlinger | F16L 11/086 138/109 |
| 5,105,854 A | * | 4/1992 | Cole | F16L 33/2076 138/109 |
| 5,137,309 A | * | 8/1992 | Beagle | F16L 33/2076 285/256 |
| 5,622,393 A | * | 4/1997 | Elbich | F16L 33/223 285/245 |
| 6,419,278 B1 | * | 7/2002 | Cunningham | F16L 33/2071 285/256 |
| 2003/0047943 A1 | | 3/2003 | Berg | |
| 2006/0071469 A1 | * | 4/2006 | Romanelli | F16L 33/2076 285/256 |
| 2007/0096461 A1 | * | 5/2007 | Owens | 285/256 |
| 2007/0157443 A1 | | 7/2007 | Baldwin et al. | |
| 2011/0132487 A1 | | 6/2011 | Steinhanses et al. | |
| 2012/0086201 A1 | | 4/2012 | Murken | |
| 2014/0326352 A1 | * | 11/2014 | Kury | 138/109 |

* cited by examiner

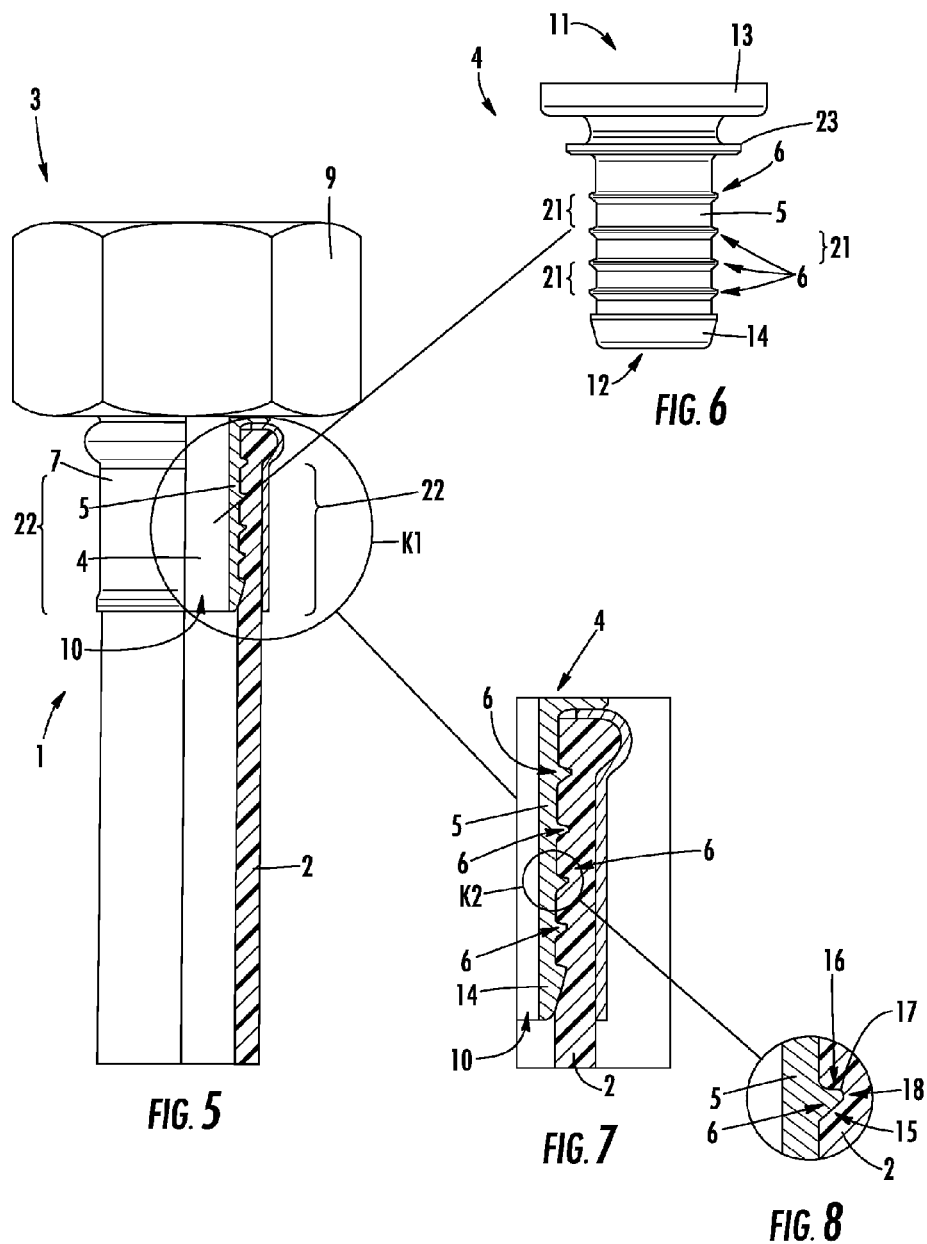

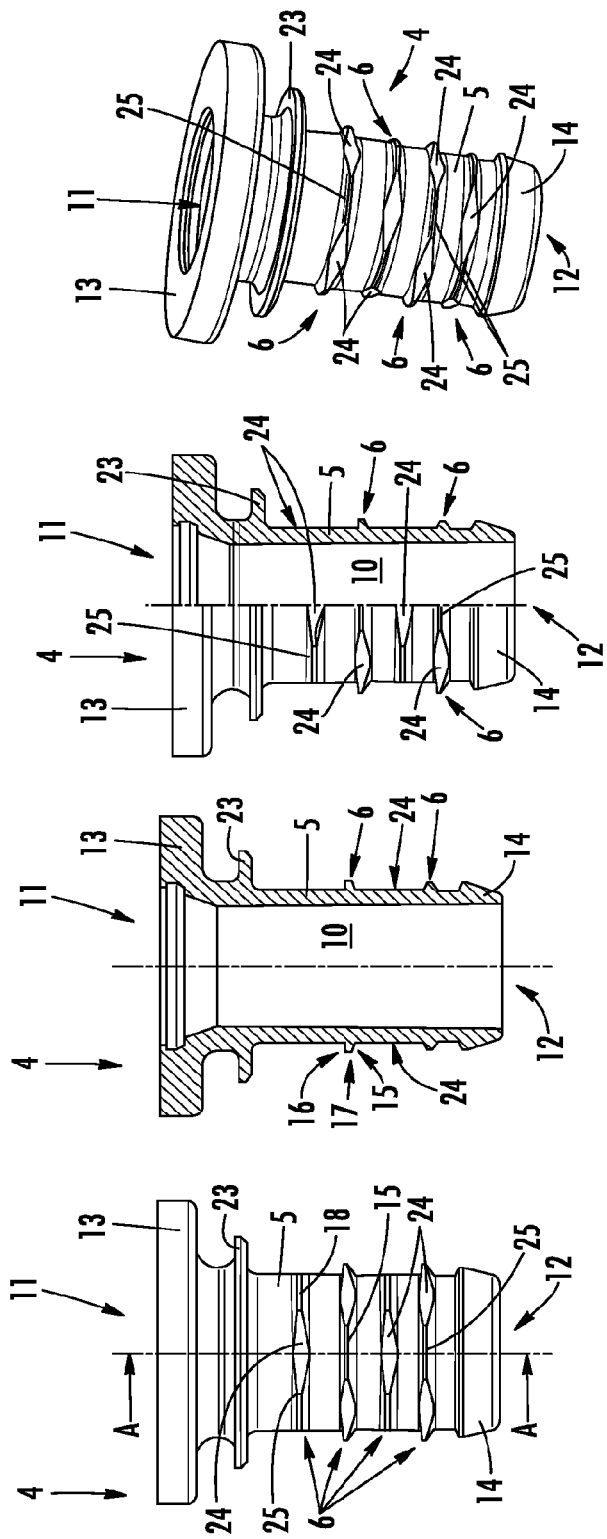

HOSE NIPPLE AND HOSE ARRANGEMENT

BACKGROUND

The invention relates to a hose nipple for a hose connecting piece of a water supply system, said hose nipple having a sleeve-shaped nipple base body which has an outlet end and a hose end, and, on an inside accommodates a through-flow channel which connects the outlet end and the hose end, wherein at least three holding ribs, which extend in each case around the nipple base body at least in portions and are spaced apart axially from one another, are integrally formed on the outside of the nipple base body, wherein the nipple base body is realized in a tapering manner with an outer diameter which reduces toward the hose end, and wherein holding ribs which are adjacent in each case are spaced apart by an axial spacing.

The invention further relates to a hose arrangement for a water supply system, said hose arrangement having a pressure hose and a hose connecting piece which has a hose nipple and a crimping sleeve which engages around the hose nipple and the pressure hose, wherein the pressure hose is held in a force-locking and/or form-locking manner between the crimping sleeve and the hose nipple.

Such types of hose nipples and hose arrangements are known and are frequently used wherever a flexible pressure hose is to be provided with a hose connecting piece in order to be able to connect the pressure hose in a releasable but pressure-tight manner to a water supply system.

EP 2 020 552 A1 has already previously made known a tubular component having an end piece which has a profile and having a groove which is arranged on the end piece for receiving a sealing element. The previously known component is intended for the purpose of being inserted into a connecting piece which can be provided as a fitting, sleeve or another arbitrary tubular component. In this case, such tubular components and the connecting pieces are assembled to form an overall system which is intended for guiding a fluid. In the overlapping region between the connecting piece and the end piece of the tubular component which engages in the connecting piece, the connecting piece and the end piece of the tubular component are usually cold-formed in order to create a fluid-tight, force-fitting connection between the connecting piece and the tubular component in this way. As a cold-forming of said component parts is necessary to the connection between the tubular component and the connecting piece, the tubular component cannot be used in conjunction with hoses which are regularly produced from a resilient material.

U.S. Pat. No. 2,121,624 has already previously described a hose nipple of the type mentioned in the introduction which is provided for a hose connecting piece of a water supply system. The previously known hose nipple has a sleeve-shaped nipple base body which has an outlet end and a hose end and on the inside accommodates a through-flow channel which connects the outlet end and the hose end. Several holding ribs which are spaced apart from one another and are rounded on the outer circumference are integrally formed on the outside of the nipple base body. In this case, the nipple base body is realized in a tapering manner with an outside diameter which decreases toward the hose end.

US 2003/0047943 A1 has already previously made known a hose arrangement having a hose coupling which has a sleeve-shaped hose connecting piece, the hose-end enveloping end region of which forms a nipple base body, onto which nipple base body the one hose end of a flexible hose can be pushed up to a stop flange. A holding sleeve, which defines a ring gap between itself and the hose connecting piece, in which ring gap the hose end pushed onto the nipple base body is clamped, is integrally formed on the outer surface of the hose connecting piece. In order to be able to secure the hose end against axial tensile forces, several holding ribs, which are spaced apart from one another and are able to mold into the resilient hose material on the inside and on the outside, are provided, on the one hand, on the nipple base body and, on the other hand, on the part region of the holding sleeve which defines the ring gap. In this case, the axial spacings between the holding ribs provided on the nipple base body are measured in groups such that a first group which is formed from several holding ribs is spaced apart from one another by a greater axial spacing compared to a further group of holding ribs at the hose end. In order to be able to clamp the hose end in the ring gap, and in order to be able to reduce the inside diameter of the holding sleeve for this purpose, on its sleeve outside circumference the holding sleeve has a cone, onto which a securing sleeve which has a complementarily formed inside circumference can be pushed. The previously known hose arrangement consists of different component parts which can sometimes only be produced at considerable expenditure.

SUMMARY

The object underlying the invention is to reduce the amount of material used on the hose nipple necessary for producing a pressure-tight connection between the hose connecting piece and the pressure hose whilst maintaining the required holding force.

This object is achieved according to the invention in the case of a hose nipple of the type mentioned in the introduction in particular in that the axial spacings in the sequence of the holding ribs on the nipple base body form a number sequence which decreases toward the hose end, and that the holding ribs with their rib crests protruding from the nipple base body describe an imaginary sleeve-shaped or hose-shaped enveloping surface, the diameter of which decreases toward the hose end.

The hose nipple as claimed in the invention has a nipple base body which is realized in a tapering manner with an outside diameter which decreases toward the hose end. In this connection, the tapering form of the nipple base body is produced as a result of the sequence of the outside diameter of the nipple base body in each case axially between two adjacent holding ribs, that is as a result of imagining that the holding ribs of the hose nipple which are integrally formed on the outside have been removed. The achievement of the invention is that the introduction of force from the individual holding ribs of a hose nipple can be provided in a more uniform manner as holding force into the pressure hose which is pushed onto the hose nipple. As a result, the material used for a hose nipple is clearly reduced as the holding ribs can be realized moved closer together axially, as a result of which the hose nipple can be produced axially in a clearly shorter manner.

As claimed in the invention, it is provided that the axial spacings in the sequence of the holding ribs on the nipple base body form a number sequence which decreases toward the hose end. The achievement as a result is that the holding ribs are arranged closer side by side in the axial direction on the hose-side end of the hose nipple than on the outlet-side end of the hose nipple. Tests have shown that as a result of the other rib form and moving the holding ribs together axially, the required holding force for the pressure hose is able to be achieved in the axial direction in spite of shortening the hose nipple. Consequently, it is possible to reduce the material used for the hose nipple.

As the holding ribs with their rib crests protruding from the nipple base body describe an imaginary sleeve-shaped or hose-shaped enveloping surface, the diameter of which decreases toward the hose end, the holding ribs do not cooperate with the material of the pressure hose axially one behind another in a line, but radially side by side and consequently axially offset and in parallel, which, in the case of a given rib size, increases the holding force which can be applied overall or, in reverse, in the case of a predetermined necessary holding force, enables reduced holding ribs and consequently less material to be used.

This can be achieved, for example, as a result of the nipple base body being formed so as to taper toward the hose end of the hose nipple or the holding rib height being realized so as to reduce toward the hose end from holding rib to holding rib or by said features being combined together and/or with further features in order to describe the enveloping surface as an imaginary geometric face.

It is particularly favorable when on the outside the nipple base body is in the form of a cone which tapers toward the hose end.

It can be expedient when, in an axial section of the hose nipple, the holding rib has a profile with a front flank which faces the hose end and a rear flank which faces the outlet end, that a rib crest of the holding rib is realized between the front flank and the rear flank, that the front flank has an S-shaped development in profile and merges into the nipple base body at a first transition radius, and that the rear flank is inclined in relation to a vertical on an outer face of the nipple base body and at its flank bottom merges into the nipple base body at a second transition radius.

As a result of said contour which deviates from the usual trapezoidal form of the profile, a particularly favorable holding force transmission from the holding ribs to the pressure hose is produced. Whilst the S-shaped front flank simplifies placing the pressure hose in position, the rear flank, which is inclined at an obtuse angle in relation to the vertical, ensures that the pressure hose, which is contracted behind the rear flank in the insertion direction, abuts against the rear flank with as large an area as possible and thus enables optimum force transmission. The design of the transition radius on the rear flank in an advantageous manner causes the pressure hose to abut against the rear flank over a large area. Consequently, unused surfaces of the holding ribs lying below cavities are avoided. The holding rib can consequently be dimensioned as small as possible.

In the case of one development of the invention, it can be provided that the first transition radius is greater than the second transition radius. Consequently, the first transition radius once again facilitates the placing in position, whilst the second transition radius realized on the rear flank prevents the pressure hose from slipping back once placed in position.

It can be advantageous when, in an axial section of the hose nipple, the holding rib has a triangular profile which is defined in a curved manner with a rounded-off tip which protrudes from the nipple base body. Tests have shown that the plateau-shaped transition region, which is usually realized between the front flank and the rear flank in the case of holding ribs of known hose nipples, is not urgently necessary for developing and bringing about a desired holding force from the hose nipple to a placed-in-position pressure hose. The advantage of the rounded design of the tip is that the holding rib does not cut into the pressure hose, but the pressure hose is able to abut against the holding rib in a substantially harmless manner. This improves the holding characteristics once again such that even though less material is used, a desired holding force is able to be provided in the pressure hose.

A further advantageous embodiment as claimed in the invention provides that each holding rib protrudes from the nipple base body by way of a respective holding rib height and that the holding rib heights in the sequence of the holding ribs on the nipple base body form a number sequence which decreases toward the hose end. It is advantageous, in this case, that in this way the application points at which the pressure hose is held in each case at the holding ribs over a considerable part, can be distributed by means of the material thickness of the pressure hose such that the force lines provided in the pressure hose by the holding ribs do not coincide, but extend parallel to one another in the pressure hose. This provides the advantage that the size of the individual holding ribs can be reduced with respect to the holding ribs of known hose nipples, as a result of which the material used for producing the hose nipple can be reduced whilst the holding force is maintained.

Particularly favorable developments are produced as a result of combining individual or all of the proposed solutions of the noted object, as in said case the amount of material used is particularly small.

In the case of one development of the invention, it is provided that the through-flow channel has a constant or uniform inside diameter between the hose end and the outlet end. It is advantageous, in this case, for the through-flow channel to be able to be realized with little expenditure using a simple production operation such as drilling or milling.

The at least one holding rib can be realized so as to extend around continuously on the nipple base body. Consequently, the holding rib is realizable by means of lathe-turning.

It can also be provided that interruptions are realized on the holding rib in the circumferential direction. As a result of the interruptions, the holding rib is divided into holding rib segments, which extend in each case along a circumferential portion. It can be provided that the interruptions of the holding rib are realized by flattenings of the holding rib height. Consequently, the holding rib height is not constant in the circumferential direction, but is reduced in the region of the interruptions, preferably to the level of the nipple base body. It is advantageous in the case of said development that the job of displacement, which is necessary to press the holding ribs into the material of the pressure hose, is able to be reduced. Consequently, the stress on the nipple base body during crimping can be reduced and thinner material thicknesses can be used for the nipple base body.

It is particularly favorable when the interruptions on adjacent holding ribs are rotationally offset with respect to one another by an angle of rotation. It is advantageous, in this case, for circumferential portions of the holding rib segments of the individual holding ribs to be able to overlap in an axial projection such that, no interruptions remain in the projection without a holding rib segment. Consequently, it can be achieved that the pressure hose is held in each circumferential portion in a form-fitting manner by at least one holding rib segment.

In a preferred manner, on the nipple base body at least one circumferential portion is created in which interruptions on a holding rib alternate in the axial direction with holding rib segments on the adjacent holding ribs. Consequently, a sequence of interruption-holder segment-interruption etc. can be formed in the axial direction. Consequently, a contact face, which runs axially through the interruption and extends between the holding ribs adjacent to the central holding rib, is created for the pressure hose. The contact face consequently has an axial extension length which is approximately twice as long as the holding rib spacing between two holding ribs. Consequently, the shear face for absorbing shear forces can be enlarged. It can also be provided that in an axial connecting line between two interruptions, which are realized on holding ribs which are axially spaced apart from one another, at least one holding rib segment is realized. It can also be provided that at least one interruption is realized in an axial connecting line between two holding rib segments, which are realized at holding ribs which are axially spaced apart from one another. Consequently, it can be achieved that the gap or interruption of a holding rib formed by an interruption is covered in the axial direction by at least one holding rib segment on an adjacent holding rib.

To achieve the noted object, in the case of a hose arrangement of the type named in the introduction, it is provided that the hose nipple is realized as claimed in the invention. Consequently, a hose arrangement is provided where the hose nipple is able to be produced with as small an amount of material as possible whilst maintaining a desired compressive strength.

It is particularly favorable when the crimping sleeve has a crimping portion which extends axially at least up to the axial position of the hose end of the hose nipple. It is advantageous, in this case, that in this way the entire axial length of the hose nipple inserted in the pressure hose can be utilized for realizing the force-locking and/or form-locking connection between the pressure hose and the hose nipple. Parts of the hose nipple protruding axially beyond the crimping or crimp sleeve are consequently avoidable, as a result of which the necessary material used for production of the hose nipple can be reduced again in relation to known hose nipples.

In the case of one development of the invention, it is provided that each holding rib reduces the placed-in-position pressure hose in each case to a remaining radial material thickness and that the remaining radial material thicknesses in the sequence of the holding ribs on the nipple base body form a number sequence which increases toward the hose end. Consequently, the achievement is that in the axial development toward the hose end of the hose nipple on the holding ribs in relation to the holding rib which goes ahead in each case, more material remains between the outer surface of the placed-in-position pressure hose and the protruding tip or the protruding rib crest of the holding rib such that the tensile load of each holding rib can be slid past the holding rib following in each case toward the hose end in the material of the pressure hose. This arrangement is particularly favorable for parallel force introduction of holding forces from the holding ribs in the placed-in-position pressure hose.

A particularly good utilization of material at the pressure hose can be achieved when the or a holding rib height of a first holding rib and the or a holding rib height of a holding rib adjacent on the outlet end are chosen in such a manner in relation to one another and in relation to the or an axial spacing between the first holding rib and the holding rib adjacent on the outlet end that the tensile force which can be absorbed by the pressure hose in the region of the first holding rib with the reduced material thickness is at least identical or precisely identical to the sum of the tensile force which can be absorbed by the pressure hose in the region of the holding rib adjacent on the outlet end with the reduced material thickness and of the shear force which can be absorbed by the pressure hose in the region between the first holding rib and the holding rib adjacent on the outlet end. Consequently, it is achieved in a simple manner that the respective material used on the holding ribs is selected in an optimum manner both on the hose nipple side and on the pressure hose end. For the maximum load at which the placed-in-position pressure hose would tear at the first holding rib, is precisely just as large as a result of the development as the load at which the pressure hose would tear at the adjacent holding rib on the outlet end, in the latter case the pressure hose would also have to be sheared off additionally between the two named holding ribs at the radial height of the first holding rib.

BRIEF DESCRIPTION OF THE DRAWINGS

The invention will now be described in more detail by way of an exemplary embodiment, however it is not restricted to this exemplary embodiment. The exemplary embodiment rather shows a preferred development where the proposed solutions of the named object are combined in such a manner that a material use which is as low as possible overall is produced for the hose nipple. Further exemplary embodiments are produced as a result of combining individual or several features of the protected claims together and/or with individual or several features of the exemplary embodiments, in which:

FIG. 5 shows a hose arrangement as claimed in the invention, FIG. 6 shows a component drawing of a hose nipple as claimed in the invention from the hose arrangement as claimed in the invention according to FIG. 5, FIG. 7 shows an enlarged detail of the hose arrangement according to FIG. 5, FIG. 8 shows an enlarged detail from FIG. 7 with a holding rib as claimed in the invention of a hose nipple as claimed in the invention, FIG. 10 shows a side view of a further hose nipple as claimed in the invention with holding ribs which extend around in an interrupted manner, FIG. 11 shows an axial sectional representation of the hose nipple from FIG. 10, FIG. 12 shows the hose nipple from FIG. 10 in an opposite position to the side view according to the FIG. 10 with the sectional view according to FIG. 11, and FIG. 13 shows a three-dimensional inclined view of the hose nipple from FIG. 10.

DETAILED DESCRIPTION OF THE PREFERRED EMBODIMENTS

Figures 1, 2, 3, 4:
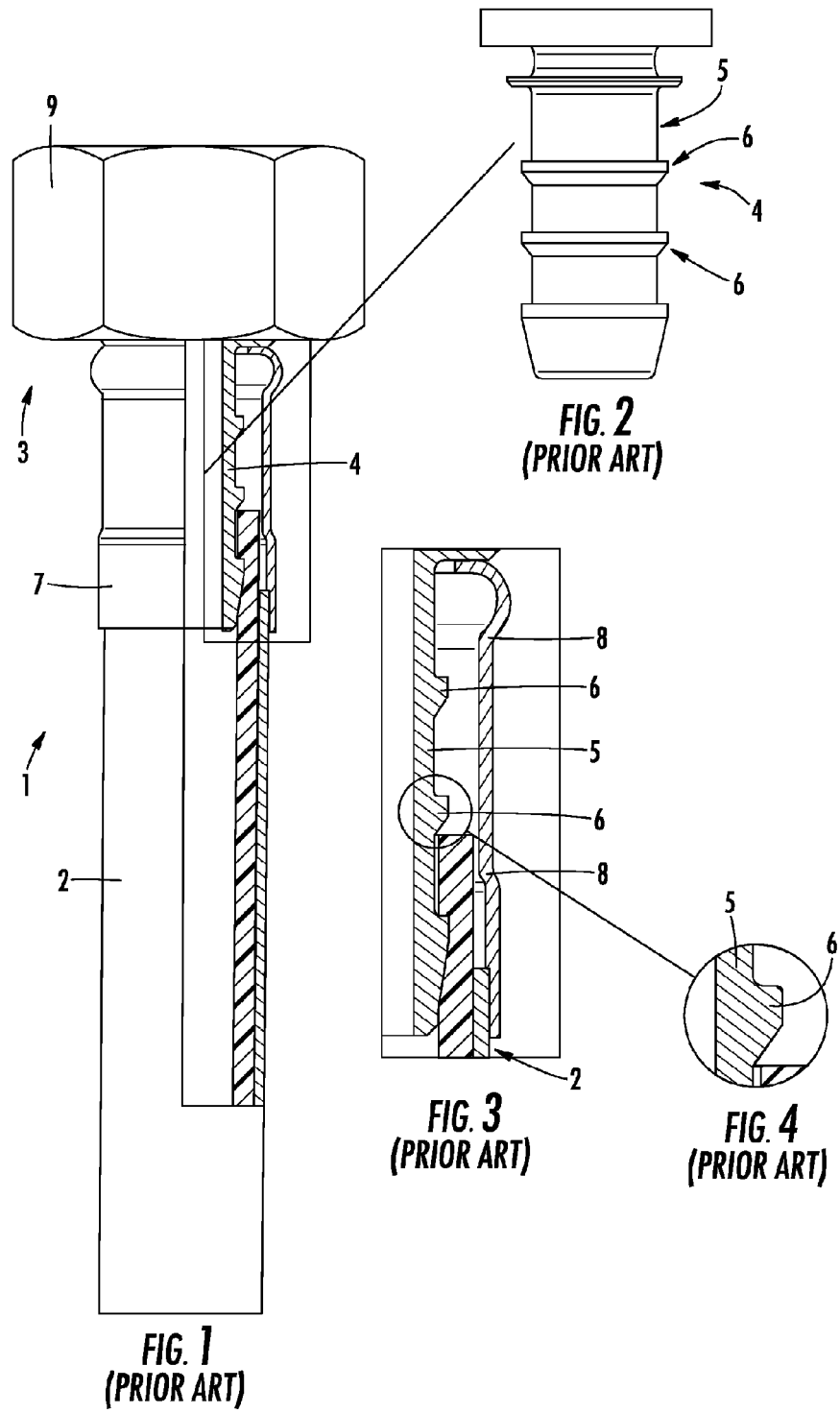
FIG. 1 shows a hose arrangement as claimed in the prior art.
FIG. 2 shows a hose nipple as claimed in the prior art according to FIG. 1.
FIG. 3 shows an enlarged representation of the detail from the hose arrangement according to FIG. 1.
FIG. 4 shows another enlarged representation of the detail from FIG. 3.

FIGS. 1 to 4 shows a hose arrangement as claimed in the prior art which is given the reference 1 as a whole.

The hose arrangement 1 has a pressure hose 2 and a hose connecting piece 3 which is fastened on one end of the pressure hose 2.

The hose connecting piece 3 has a hose nipple 4 which has a cylindrical nipple base body 5 with a cylindrical inside face and a cylindrical outside face.

On the outside of the nipple base body 5, holding ribs 6 are realized extending around the nipple base body 5 completely. The holding ribs 6 are spaced apart by a uniform axial spacing and a uniform holding rib height. The holding ribs 6 are additionally realized with an identical, trapezoidal cross sectional profile.

The hose nipple 4 is inserted into the end of the pressure hose 2, and a crimping sleeve 7 engages around the pressure hose 2 with the inserted hose nipple 4.

The crimping sleeve 7 is crimped between the ends 8 of a crimp region such that the holding ribs 6 bring about a form-fitting hold on the completely inserted pressure hose 2.

A nut is fastened as a fastening element 9 in a manner known per se on the outlet-side end of the hose nipple 4.

FIGS. 5 to 9 show a hose arrangement 1 according to the invention.

The hose arrangement 1 according to the invention has a pressure hose 2 on which a hose connecting piece 3 is held in a force-locking and/or form-fitting manner.

FIG. 7 shows an enlargement of a detail of the circle K1 from FIG. 5.

FIG. 8 shows another enlargement of a detail of the circle detail K2 from FIG. 7.

Figure 9:
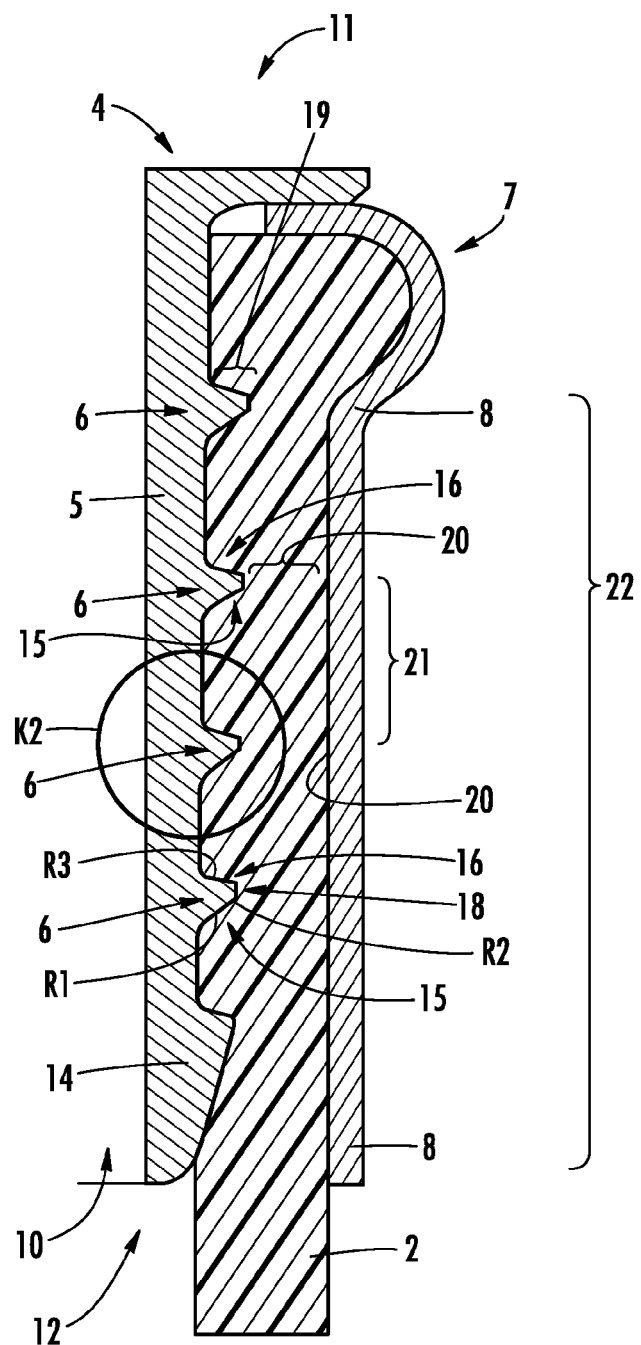
FIG. 9 shows an enlarged representation of FIG. 7.

FIG. 9 is another enlargement of FIG. 7.

FIG. 7, FIG. 8, and FIG. 9 as well as in part FIG. 5, show an axial section of details of the hose arrangement 1 as claimed in the invention.

The hose connecting piece 3 in FIG. 5 has a hose nipple 4 which is shown separately in FIG. 6.

In particular in the partial sectional representation according to FIG. 5, it can be seen that the hose nipple 4 has a sleeve-shaped nipple base body 5 which surrounds and defines in the axial direction a through-flow channel 10 which extends in the interior of the hose nipple 4.

The through-flow channel 10 extends between the outlet end 11 and the hose end 12 of the hose nipple 4 and serves for conducting the liquid directed in the water supply system.

A nipple flange 13, which enables a sealed connection to the water supply system and which holds the fastening element 9, is realized on the outlet end 11 of the hose nipple 4.

Instead of the nut shown as an example, it is also possible to realize or fasten other fastening elements 9 on the hose nipple 4, for example fastening elements with external thread.

For use, that is to produce the connection between the hose connecting piece 3 and the pressure hose 2, the hose nipple 4 is inserted into the pressure hose 2 with its hose end 12 in front, an insertion aid 14 on the hose-side end facilitating the insertion. To this end, the insertion aid 14 has a male taper.

To bring about positive locking between the hose nipple 4 and the pressure hose 2, four holding ribs 6 are integrally formed on the outside of the nipple base body 5.

In the case of further exemplary embodiments other numbers of holding ribs 6 can also be realized.

The holding ribs 6 extend in each case continuously along the complete circumference of the nipple base body 5 on the outer surface thereof and consequently extend around said nipple base body.

The holding ribs 6 are realized at a spacing from the hose-side end 12 of the hose nipple 4 and, in the position of use, dig into the material of the pressure hose 2 in order to bring about the positive locking.

The nipple base body 5 of the hose nipple 4 according to the invention, which is produced as a result of imagining that the holding ribs 6 and the insertion aid 14 have been removed from the hose nipple 4, is in the form of a sleeve which deviates from the cylinder shape as a result of the outside diameter of the nipple base body 5 reducing toward the hose end 12. This means that on the outside the form of the nipple base body 5 tapers away from the outlet end 11.

This is achieved in the case of the hose nipple 4 according to FIG. 6 as a result of the nipple base body 5 being in the form of a cone on the outside, the tapered end of which is at the hose end 12.

In contrast, the inside of the sleeve form of the nipple base body 5 is cylindrical in form as the through-flow channel 10 is bored with a uniform inside diameter.

Consequently, the material thickness of the nipple base body decreases in the axial development between the outlet end 11 and the hose end 12.

In the enlargements according to FIG. 8 and FIG. 9, it can be seen that the holding ribs 6 in the axial sections shown have an axial profile which deviates from the known trapezoidal form (cf. FIG. 4).

The profile of the holding ribs 6 has in each case a front flank 15 and a rear flank 16, between which at the projecting tip the rib crest 18, which extends around the nipple base body 5 in the circumferential direction, is realized. The front flank 15, in this connection, comes into contact with the material of the pressure hose 2 first of all when it is being inserted.

In order to facilitate said inserting movement, the front flanks 15 are realized in profile with an S-shaped development, a transition radius R1 merging into the nipple base body 5 being followed by a transition radius R2 with the opposite curvature. The rib crest 18, which marks the point of the holding rib 6 which protrudes the furthest, connects to the transition radius R2 in the further development of the profile.

The rear flank 16 is realized substantially as a conical circular ring which is inclined in relation to a vertical on the outer surface of the nipple base body 5 in such a manner that an obtuse angle is produced. The rear flank 16 merges into the nipple base body at a radius R3, the radius of curvature R3 being chosen to be smaller than the radius of curvature of the transition radius R1.

The holding ribs 6 are not realized identically, but simply with respect to one another have a geometrically similar profile which forms a triangle which is defined in a curved manner, its one tip 17 protruding from the nipple base body 5 and being rounded-off.

In the position of use the tip 17, which forms or defines the rib crest 18, digs into the pressure hose 2 abutting against the nipple base body 5 such that the rear flank 16 is able to bring about a form-fitting hold on the pressure hose 2 and the free outer surfaces of the nipple base body 5 between the holding ribs 6 are able to bring about a force-locking hold on the pressure hose 2.

The contact pressure of the pressure hose 2 necessary for this is reinforced by the crimping sleeve 7 which is placed onto the pressure hose 2 and is crimped in the crimp region 22 which is defined by the ends 8.

In the case of the hose arrangement as claimed in the invention, the crimp region or crimp portion 22 consequently extends at the hose end 12 in the axial direction to beyond the end of the hose nipple 4.

It can be seen in more detail in FIG. 9 that each of the holding ribs 6 protrudes at a holding rib height 19 from the nipple base body 5, to simplify the representation said holding rib height 19 only being marked for the first holding rib 6 at the outlet end 11.

The respective holding rib heights 19 of the individual holding ribs 6 decrease from the outlet end 11 toward the hose end 12 such that a number sequence (in FIG. 9 of four elements) which decreases toward the hose end 12 is produced in the sequence of the holding ribs 6.

The rib crests 18 which protrude from the nipple base body 5 consequently describe an imaginary sleeve-shaped or hose-shaped enveloping surface, the diameter of which decreases toward the hose end 12 in a conical tapering manner.

If, in the case of the exemplary embodiment shown, the holding rib heights 19 are applied as a function of the axial position of the associated holding rib 6, a straight line is produced.

As the crimping sleeve 7 has a substantially cylindrical development in its crimp portion 22 between the ends 8, this means that the radial material thickness 20, to which the pressure hose 2 is reduced in each case by the holding ribs 6 digging in, increases from the outlet end 11 toward the hose end 12.

It can also be seen from FIG. 9 that the holding ribs 6 are spaced apart from one another at a greater axial spacing toward the outlet end 11.

The holding ribs 6 arranged further toward the hose end are consequently spaced apart from one another at a narrower spacing in the axial direction than the holding ribs 6 which are arranged further toward the outlet end.

As a result, the axial spacings 21 of the holding ribs in the sequence of the holding ribs 6 on the nipple base body 5 form a number sequence (in the example of three elements) which decreases toward the hose end 12.

The axial spacing between the holding rib 6, which is adjacent to the insertion aid 14, and the rear flank of the insertion aid 14 is also realized smaller in relation to the remaining axial spacings 21 such that the mentioned decreasing number sequence is continued as a result.

A circumferential nipple collar 23, which also defines the nipple base body 5, is realized on the hose nipple 4 as a stop for the pressure hose 2 which is placed onto the hose nipple 4 with the crimping sleeve 7. This nipple collar 23, which can be seen in more detail in FIG. 6, serves at the same time as a stop for the hose end of the pressure hose when the hose nipple 4 is pressed in.

The achievement as a result of the combination between the development of the holding ribs 6 and the outer surface of the nipple base body 5, is that in the case of a pair of adjacent holding ribs 6, the holding rib 6 positioned in each case closer to the outlet end 11 projects radially beyond the holding rib 6 positioned in each case closer to the hose end 12 such that a force line, which extends from the rib crest 18 of one holding rib 6 into the pressure hose 2 toward the hose end 12, is axially aligned and consequently extends along a cylindrical face which is coaxial with respect to the hose nipple 4, does not contact the remaining holding ribs 6 which are positioned between said holding rib 6 and the hose end 12.

Consequently, the force lines constructed in each case in the pressure hose 2 extend parallel to one another and consequently produce a particularly favorable introduction of force from the hose nipple 4 onto the pressure hose 2.

In the case of the exemplary embodiment shown, the holding rib heights 19 of adjacent holding ribs 6 are chosen in relation to one another and in relation to the axial spacing 21 between the holding ribs 6 such that the material strength of the pressure hose 2 is able to be utilized in an optimum manner.

For the holding rib heights 19 are chosen in each case such that the force, which would be necessary as a maximum tensile force in order to tear off the pressure hose at a selected holding rib 6 in the region of the reduced material thickness 20, is just as great as the sum of the forces which are necessary as a maximum tensile or shear force in order to tear off, on the one hand, the pressure hose 12 at the holding rib 6 adjacent in the direction of the outlet end 11 and following axially and, on the other hand, to shear off the pressure hose 2 in the region of the axial spacing 21 between the viewed holding ribs 6 in such a manner that the material of the pressure hose 2 abutting against the rear flank 16 in the "shadow" of the holding rib 6 remains as a ring-shaped remainder on the hose nipple 4.

The tensile forces which can be absorbed by the regions of reduced material thickness 20 are consequently matched to the shear forces which can be absorbed between the holding ribs 6, by the holding rib height 19, the axial spacings 21 and the material thickness of the pressure hose 2 being fixed corresponding to the material characteristics of the pressure hose 2.

In the case of the size DN6 hose nipples known from the prior art, the cylindrical nipple base body extends between a diameter measurement of 4.7 mm and 6.1 mm. The holding ribs connect thereto up to a diameter of 7.2 mm.

In the case of the size DN6, the pressure hose 2, including a production tolerance, has a minimum diameter of 6.1 mm and extends up to a diameter of 9.6 mm, a jacketed hose being provided between the diameter range of 9.0 mm and 9.6 mm.

A hose arrangement known from the prior art as DN8 has a hose nipple, the nipple base body of which has a uniform inside diameter of 6.2 mm and a uniform outside diameter of 7.7 mm.

In the case of the size DN8, the holding ribs up to a diameter of 9.0 mm connect to the nipple base body.

A hose, which, including a tolerance range, extends from an inside diameter of 7.9 mm up to an outside diameter of 11.6 mm, fits onto said hose nipple.

In the case of the hose nipple as claimed in the invention, the nipple base body, in a preferred embodiment, has a uniform inside diameter of 5.8 mm, whilst the outside diameter of the nipple base body increases from a value of 7.0 mm close to the outlet end to a value of 7.3 mm close to the hose end of the hose nipple.

The measurement for the radial holding rib height in this example also increases from a value of 0.4 mm close to the outlet end to a value of 0.45 mm close to the hose end of the hose nipple.

A pressure hose which has an inside diameter of 7.4±0.3 mm and an outside diameter of 10.4 mm is suitable for this purpose, a hose of this type jacketed on the outside taking on an 0.3 mm wall thickness.

In further exemplary embodiments, other dimensions can be realized depending on the materials used and the holding force required.

In the case of the invention, the pressure hose 2 can be realized from a uniform material or as a multi-layered pressure hose.

In the case of the invention, the hose nipple can be produced from metal or from plastics material or from another material, metal being preferred as the material in order to absorb the stress during the crimping of the crimping sleeve.

FIGS. 10 to 13 show different views of a further hose nipple 4 according to the invention and are described together below.

Components and details which are functionally and/or structurally identical to corresponding components and details of the hose nipple according to FIGS. 5 to 9, are designated with concurring references and are not described again separately. The statements regarding FIGS. 5 to 10, in particular with reference to the development of the holding rib profiles, holding rib heights 19, material thicknesses and axial spacings 21 (not shown any further here) consequently apply in the same way in this case.

The hose nipple 4 according to FIGS. 10 to 13 differs from the hose nipple 4 described beforehand in that the holding ribs 6 on the nipple base body 5 are not realized extending continuously around.

Rather, several interruptions 24 are realized in each holding rib 6, by means of which each holding rib 6 is divided in the circumferential direction into a sequence of interruptions 24 and holding rib segments 25.

As can be seen in more detail from FIGS. 11 and 12, the holding rib height 19 (not shown in FIGS. 10 to 13) is reduced to the level of the outer face of the nipple base body 5 as a result of a flattening in the circumferential portion of the interruptions 24. The holding rib height 19, in this connection, is decreased continuously in the circumferential direction from the maximum value at the tip 17 of the holding rib crest 18 to the level of the nipple base body 5 in order then to increase again in the circumferential direction to the maximum value.

The interruptions 24, in this case, are arranged and realized on adjacent holding ribs 6 offset in the circumferential direction with respect to one another by an angle of rotation—in this case of 90°.

As a result, the interruptions 24 on the nipple base body 5 are realized in an alternate manner or an opposing manner, in the exemplary embodiment in a decussate manner.

Each holding rib 6 has four interruptions 24 which divide the holding rib 6 into four holding rib segments 25.

Each holding rib segment 25 consequently runs around the nipple body in a circumferential portion.

The holding rib segments 25 are consequently arranged on two adjacent holding ribs 6 also rotationally offset with respect to one another by an angle of rotation.

In this connection, circumferential portions are created in which the interruptions 24 on one holding rib 6 alternate in the axial direction with holding rib segments 25 on the adjacent holding ribs 6.

In the case of the hose nipple 4 for a hose arrangement 1 with holding ribs 6 on the outside which extend at least in portions in the circumferential direction, it is proposed to vary the shape, size and arrangement on the nipple base body 5 of the holding ribs 6 in such a manner between the hose end 12 and the outlet end 11 of the hose nipple 4 that a uniform, parallel introduction of force is produced from the holding ribs 6 into the pressure hose 2, which introduction of force brings about the force-locking and/or form-locking connection between the hose nipple 4 and the pressure hose 2 placed thereon.

The invention claimed is:

1. A hose nipple (4) for a hose connecting piece (3) of a water supply system, said hose nipple comprising a sleeve-shaped nipple base body (5) which has an outlet end (11) and a hose end (12), and on an inside accommodates a through-flow channel (10) which connects the outlet end (11) and the hose end (12), at least three holding ribs (6), which extend in each case around the nipple base body (5) at least in portions and are spaced apart axially from one another by an axial spacing (21), are integrally formed on an outside of the nipple base body (5), the nipple base body is tapered with an outer diameter which reduces toward the hose end 12, and the axial spacings (21) between the holding ribs (6) on the nipple base body (5) successively decrease toward the hose end (12), and the holding ribs (6) include rib crests (18) which protrude from the nipple base body (5) and describe an imaginary sleeve-shaped or hose-shaped enveloping surface, a diameter of which decreases toward the hose end (12), wherein in an axial section of the hose nipple (4), each of the holding ribs (6) has a profile with a front flank (15) which faces the hose end (12) and a rear flank (16) which faces the outlet end (11), the rib crest (18) of the holding rib (6) is realized between the front flank (15) and the rear flank (16), the front flank (15) has an S-shaped development in profile and merges into the nipple base body (5) at a first transition radius (R1), and the rear flank (16) is inclined in relation to a vertical thereby forming an obtuse angle on an outer face of the nipple base body (5) and at a flank bottom merges into the nipple base body (5) at a second transition radius (R3) and wherein the first transition radius (R1) is greater than the second transition radius (R3).

2. The hose nipple (4) as claimed in claim 1, wherein on an outside the nipple base body (5) is in the form of a cone which tapers toward the hose end (12).

3. The hose nipple (4) as claimed in claim 1, wherein in an axial section of the hose nipple, each holding rib (6) has a triangular profile which is defined in a curved manner with a rounded-off tip (17) which protrudes from the nipple base body.

4. The hose nipple (4) as claimed in claim 1, wherein each of the holding ribs (6) protrudes from the nipple base body (5) by a respective holding rib height (19) and the holding rib height (19) in the sequence of the holding ribs (6) on the nipple base body (5) accommodates a flow-through channel (10) which connects to the hose end (12), and at least two of the holding ribs (6) which are spaced apart from one another axially are integrally formed on an outside of the nipple base body (5).

5. The hose nipple (4) as claimed in claim 1, wherein the through-flow channel (10) has a constant or uniform inside diameter between the hose end (12) and the outlet end (11).

6. The hose nipple (4) as claimed in claim 1, wherein the at least one of the holding ribs (6) extends around continuously on the nipple base body (5).

7. The hose nipple (4) as claimed in claim 1, wherein interruptions (24) are provided in the holding ribs (6) in a circumferential direction.

8. The hose nipple (4) as claimed in claim 7, wherein a holding rib height (19) of one of the holding ribs (6) is reduced in a circumferential direction in a region of the interruptions (24).

9. The hose nipple (4) as claimed in claim 7, wherein the interruptions (24) on adjacent ones of the holding ribs (6) are rotationally offset with respect to one another by an angle of rotation.

10. The hose nipple (4) as claimed in claim 7, wherein on the nipple base body (5) at least one circumferential portion is created in which the interruptions (24) on one of the holding ribs (6) alternate in an axial direction with holding rib segments (25) on the adjacent holding ribs (6).

11. A hose arrangement (1) for a water supply system, said hose arrangement comprising a pressure hose (2) and a hose connecting piece (3) which has a hose nipple (4) and a crimping sleeve (7) which engages around the hose nipple (4) and the pressure hose (2), the pressure hose (2) is held in at least one of a force-locking or form-locking manner between the crimping sleeve (7) and the hose nipple (4), and the hose nipple (4) comprises a sleeve-shaped nipple base body (5) which has an outlet end (11) and a hose end (12), and on an inside accommodates a through-flow channel (10) which connects the outlet end (11) and the hose end (12), at least three holding ribs (6), which extend in each case around the nipple base body (5) at least in portions and are spaced apart axially from one another by an axial spacing (21), are integrally formed on an outside of the nipple base body (5), the nipple base body is tapered with an outer diameter which reduces toward the hose end 12, and the axial spacings (21) between the holding ribs (6) on the nipple base body (5) successively decrease toward the hose end (12), and the holding ribs (6) include rib crests (18) which protrude from the nipple base body (5) and describe an imaginary sleeve-shaped or hose-shaped enveloping surface, a diameter of which decreases toward the hose end (12), wherein each of the holding ribs (6) reduces a placed-in-position pressure hose (2) in each case to a remaining radial material thickness (20) and the remaining radial material thicknesses (20) in the sequence of the holding ribs (6) on the nipple base body (5) form a number sequence which increases toward the hose end (12) and wherein a holding rib height (19) of a first one of the holding ribs (6) and a holding rib height (19) of one of the holding ribs (6) adjacent to the outlet end are chosen in such a manner in relation to one another and in relation to an axial spacing (21) between the first holding rib (6) and the holding rib (6) adjacent on the outlet end that a tensile force which is absorbable by the pressure hose (2) in a region of the first holding rib (6) with the reduced material thickness (20) is at least identical or precisely identical to a sum of the tensile force which is absorbable by the pressure hose (2) in a region of the holding rib (6) adjacent on the outlet end with the reduced material thickness (20) and of a shear force which is absorbable by the pressure hose (2) in a region between the first holding rib (6) and the holding rib (6) adjacent on the outlet end.

12. The hose arrangement (1) as claimed in claim 11, wherein the crimping sleeve (7) has a crimping portion (22) which extends axially at least up to an axial position of the hose end (12) of the hose nipple (4).

* * * * *